(12) United States Patent
Klatt et al.

(10) Patent No.: US 11,533,718 B2
(45) Date of Patent: Dec. 20, 2022

(54) METHOD FOR TRANSMITTING PAYLOAD AND/OR CONTROL DATA BETWEEN A BASE STATION ENTITY AND A USER EQUIPMENT OF A MOBILE COMMUNICATION NETWORK

(71) Applicant: Deutsche Telekom AG, Bonn (DE)

(72) Inventors: Axel Klatt, Cologne (DE); Raimund Walsdorf, Bonn (DE)

(73) Assignee: DEUTSCHE TELEKOM AG, Bonn (DE)

( * ) Notice: Subject to any disclaimer, the term of this patent is extended or adjusted under 35 U.S.C. 154(b) by 0 days.

(21) Appl. No.: 17/642,712

(22) PCT Filed: Sep. 29, 2020

(86) PCT No.: PCT/EP2020/077248
§ 371 (c)(1),
(2) Date: Mar. 14, 2022

(87) PCT Pub. No.: WO2021/063955
PCT Pub. Date: Apr. 8, 2021

(65) Prior Publication Data
US 2022/0330212 A1    Oct. 13, 2022

(30) Foreign Application Priority Data
Sep. 30, 2019  (EP) .................................. 19200601

(51) Int. Cl.
*H04W 72/04*   (2009.01)
*H04W 74/00*   (2009.01)
(Continued)

(52) U.S. Cl.
CPC ......... *H04W 72/042* (2013.01); *H04L 5/0044* (2013.01); *H04L 5/14* (2013.01); *H04W 74/004* (2013.01); *H04W 72/0453* (2013.01)

(58) Field of Classification Search
CPC .................. H04W 72/042; H04W 74/004; H04L 5/0044; H04L 5/14
See application file for complete search history.

(56) References Cited

U.S. PATENT DOCUMENTS

2017/0367110 A1   12/2017   Li et al.
2018/0041957 A1   2/2018    Xiong et al.
(Continued)

FOREIGN PATENT DOCUMENTS

CN    109892001 A    6/2019
CN    110786066 A    2/2020
WO    WO 2019051242 A2   3/2019

*Primary Examiner* — Chi Ho A Lee
*Assistant Examiner* — Andrew Lee
(74) *Attorney, Agent, or Firm* — Leydig, Voit & Mayer, Ltd.

(57) ABSTRACT

A method for transmitting payload and/or control data in downlink and/or uplink directions between a base station entity and a user equipment of a mobile communication network includes: in a first step, the user equipment detects the at least one downlink control signal and the specific downlink radio transmission frequency as an initial downlink radio transmission resource; and in a second step, subsequent to the first step, the user equipment receives downlink control information from the base station entity. The content or value of the downlink control information indicates or defines an initial uplink radio transmission resource.

12 Claims, 2 Drawing Sheets

(51) Int. Cl.
H04L 5/00 (2006.01)
H04L 5/14 (2006.01)

(56) References Cited

U.S. PATENT DOCUMENTS

| | | |
|---|---|---|
| 2019/0104543 A1 | 4/2019 | Park |
| 2019/0357092 A1* | 11/2019 | Jung .................. H04W 36/0055 |
| 2020/0177266 A1* | 6/2020 | Kang .................... H04W 76/27 |
| 2021/0058970 A1* | 2/2021 | Kwak ................. H04W 72/042 |
| 2021/0219297 A1* | 7/2021 | MI ......................... H04L 1/1671 |
| 2021/0243814 A1* | 8/2021 | Zhang ............... H04W 74/0833 |
| 2021/0289548 A1* | 9/2021 | Murray ............... H04W 72/042 |
| 2021/0298108 A1* | 9/2021 | Wu .................... H04W 56/0045 |
| 2022/0015089 A1* | 1/2022 | Shin ..................... H04L 5/0055 |
| 2022/0116881 A1* | 4/2022 | Shin ........................ H04L 1/189 |
| 2022/0183055 A1* | 6/2022 | Rune .................. H04W 74/006 |

* cited by examiner

METHOD FOR TRANSMITTING PAYLOAD AND/OR CONTROL DATA BETWEEN A BASE STATION ENTITY AND A USER EQUIPMENT OF A MOBILE COMMUNICATION NETWORK

CROSS-REFERENCE TO PRIOR APPLICATIONS

This application is a U.S. National Phase application under 35 U.S.C. § 371 of International Application No. PCT/EP2020/077248, filed on Sep. 29, 2020, and claims benefit to European Patent Application No. EP 19200601.3, filed on Sep. 30, 2019. The International Application was published in English on Apr. 8, 2021 as WO 2021/063955 A1 under PCT Article 21(2).

FIELD

The present invention relates to a method for enhanced efficiency and/or flexibility in transmitting payload and/or control data in downlink and/or uplink direction between, on the one hand, a base station entity, and, on the other hand, a user equipment of a mobile communication network, wherein the base station entity repeatedly transmits at least one downlink control signal using a specific downlink radio transmission frequency.

Furthermore, the present invention relates to a system for enhanced efficiency and/or flexibility in transmitting payload and/or control data in downlink and/or uplink direction between, on the one hand, a base station entity, and, on the other hand, a user equipment of a mobile communication network, the system comprising at least the base station entity and the user equipment, wherein the system is configured such that the base station entity repeatedly transmits at least one downlink control signal using a specific downlink radio transmission frequency.

Additionally, the present invention relates to a user equipment for enhanced efficiency and/or flexibility in transmitting payload and/or control data in downlink and/or uplink direction between the user equipment and a base station entity of a mobile communication network, wherein the user equipment is configured such that the user equipment receives, from the base station entity, at least one downlink control signal—the at least one downlink control signal especially being repeatedly transmitted by the base station entity—using a specific downlink radio transmission frequency.

Additionally, the present invention relates to a base station entity for enhanced efficiency and/or flexibility in transmitting payload and/or control data in downlink and/or uplink direction between the base station entity and a user equipment of a mobile communication network, wherein the base station entity is configured such that the base station entity repeatedly transmits at least one downlink control signal using a specific downlink radio transmission frequency.

Furthermore, the present invention relates to a program comprising a computer readable program code, and to a computer-readable medium comprising instructions which when executed help to perform the inventive method.

The present invention improves the efficiency and/or flexibility in transmitting payload and/or control data in downlink and/or uplink direction between a user equipment and a base station entity of a mobile communication network, i.e. cellular mobile communication network.

BACKGROUND

In current and future cellular systems like systems according to the GSM-standard (Global System for Mobile communications), UMTS-standard (Universal Mobile Telecommunications System), LTE-standard (Long Term Evolution) and/or NR/5G (New Radio, 5G New Radio), basically two main duplex modes are defined for spectrum usage. One of these duplex modes is called "paired spectrum", also known as "FDD spectrum" (FDD—Frequency Division Duplex), where a certain (first) part of the frequency spectrum (i.e. of radio transmission resources of the air interface between the user equipment and the base station entity) is allocated to downlink (DL) transmissions, while another (second) part of the spectrum (or of such radio transmission resources)—having a predefined, "paired", frequency separation or frequency distance from the first part—is allocated to uplink (UL) transmissions. The (predefined) frequency separation between the uplink and the downlink frequency is called "Duplex Distance" and is typically fixed for any given FDD band. The term "band" is a representation of the frequency where wireless devices can operate. A so-called "FDD band" includes a definition of a downlink frequency, which typically denotes the middle-frequency of a part of the frequency spectrum (of that frequency band), with a given bandwidth (e.g., according to the LTE standard, a bandwidth of typically 5 MHz, 10 MHz or at maximum 20 MHz), while the uplink frequency has the same bandwidth (5 MHz, 10 MHz or 20 MHz in case of LTE) and which middle-frequency is placed the duplex distance below (typically) or above (less typical) of the middle-frequency of the downlink bandwidth. The other widely used frequency duplex scheme is the so-called Time-Division Duplex (TDD) where a single block of the frequency spectrum is used for uplink (UL) and downlink (DL), but the provision but in a time duplexing manner, i.e. on a given frequency spectrum block (i.e. radio transmission resources of the air interface) at a certain point in time, the resources are used in uplink direction while at another point in time the resources are used in downlink direction. TDD is also known as "unpaired spectrum".

Special cases for spectrum arrangements are Supplemental Uplink (SUL) and Supplemental Downlink (SDL), where "supplemental" typically denotes in some case to the use of this frequency arrangement as "supplement" to another FDD (or TDD) spectrum arrangement. SUL and SDL are differentiated by the fact that the spectrum usage is either totally Uplink or totally Downlink oriented.

In the prior art, the use of the FDD duplex mode for a communication between a base station entity and a user equipment—i.e. the transmission of payload and/or control data between such a base station entity and a user equipment, especially at the very beginning of such a communication, i.e. in case that the user equipment is transitioning from a cell search and/or cell selection and/or cell reselection state towards an idle state and/or random access enabled state with the base station entity—necessarily involves the allocation of both downlink and uplink radio transmission resources that have a fixedly (pre)defined duplex distance in the frequency domain.

SUMMARY

In an exemplary embodiment, the present invention provides a method for enhanced efficiency and/or flexibility in transmitting payload and/or control data in downlink and/or uplink directions between, on the one hand, a base station entity and, on the other hand, a user equipment of a mobile communication network, wherein the base station entity repeatedly transmits at least one downlink control signal using a specific downlink radio transmission frequency. The method comprises the following steps: in a first step, the user equipment—upon the user equipment transitioning from a cell search and/or cell selection and/or cell reselection state towards an idle state and/or random access enabled state with the base station entity—detects the at least one downlink control signal and the specific downlink radio transmission frequency as an initial downlink radio transmission resource; and in a second step, subsequent to the first step, the user equipment receives downlink control information from the base station entity, wherein the content or value of the downlink control information indicates or defines an initial uplink radio transmission resource. The initial uplink radio transmission resource is used, by the user equipment, to: access a random access channel, in the uplink direction, of the base station entity in case that the user equipment requires or is required to access a random access channel of the base station entity; and/or transmit control data and/or payload data in the uplink direction from the user equipment to the base station entity in case that the user equipment requires or is required to transmit control data and/or payload data to the base station entity. Besides the user equipment, a further user equipment is able to communicate or to be in contact with the base station entity and also detects the at least one downlink control signal and the specific downlink radio transmission frequency as the initial downlink radio transmission resource, wherein—in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—the further user equipment uses a further initial uplink radio transmission resource to: access a random access channel, in the uplink direction, of the base station entity in case that the further user equipment requires or is required to access a random access channel of the base station entity; and/or transmit control data and/or payload data in the uplink direction from the further user equipment to the base station entity in case that the further user equipment requires or is required to transmit control data and/or payload data to the base station entity. The further initial uplink radio transmission resource corresponds to a paired spectrum uplink radio transmission resource corresponding to or paired to the initial downlink radio transmission resource.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
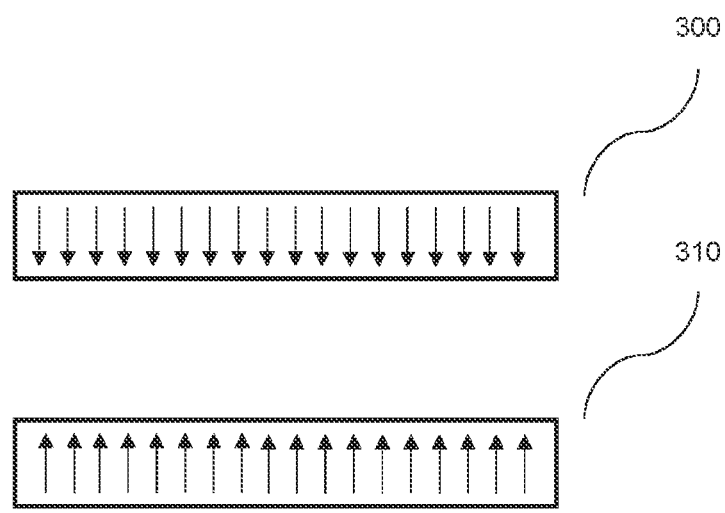
FIG. 1 schematically illustrates the basic functionality of the communication between, on the one hand, a base station entity, and, on the other hand, a user equipment of a mobile communication network according to the frequency division duplex mode.

Exemplary embodiments of the present invention is to provide a method, a system, and a telecommunications network for enhanced efficiency and/or flexibility in transmitting payload and/or control data in downlink and/or uplink direction between, on the one hand, a base station entity, and, on the other hand, a user equipment of a mobile communication network Additionally, exemplary embodiments of the present invention relate to a system, a user equipment, and a base station entity for enhanced efficiency and/or flexibility in transmitting payload and/or control data in downlink and/or uplink direction, as well as to a program comprising a computer readable program code, and to a computer-readable medium comprising instructions which when executed help to perform the inventive method.

In an exemplary embodiment, the present invention provides a method for enhanced efficiency and/or flexibility in transmitting payload and/or control data in downlink and/or uplink direction between, on the one hand, a base station entity, and, on the other hand, a user equipment of a mobile communication network, wherein the base station entity repeatedly transmits at least one downlink control signal using a specific downlink radio transmission frequency, wherein the method comprises the following steps:

in a first step, the user equipment—upon the user equipment transitioning from a cell search and/or cell selection and/or cell reselection state towards an idle state and/or random access enabled state with the base station entity—detects the at least one downlink control signal and the specific downlink radio transmission frequency as an initial downlink radio transmission resource, and in a second step, subsequent to the first step, the user equipment receives a downlink control information from the base station entity, wherein the content or value of the downlink control information indicates or defines an initial uplink radio transmission resource, wherein the initial uplink radio transmission resource is used, by the user equipment, to access a random access channel, in uplink direction, of the base station entity in case that the user equipment requires or is required to access a random access channel of the base station entity and/or to transmit control data and/or payload data in uplink direction from the user equipment to the base station entity in case that the user equipment requires or is required to transmit control data and/or payload data to the base station entity.

According to the present invention, it is advantageously possible to enhance the efficiency and/or the flexibility in transmitting payload and/or control data in downlink and/or uplink direction—between, on the one hand, a base station entity, and, on the other hand, a user equipment of a mobile communication network—via avoiding the above mentioned necessity to allocate both downlink and uplink radio transmission resources in such a manner that a fixedly (pre)defined duplex distance is observed in the frequency domain.

In a further exemplary embodiment, the present invention provides a method for enhanced efficiency and/or flexibility in transmitting payload and/or control data in downlink and/or uplink direction between, on the one hand, a base station entity, and, on the other hand, a user equipment of a mobile communication network, wherein the base station entity repeatedly transmits at least one downlink control signal using a specific downlink radio transmission frequency, wherein the method comprises the following steps:

in a first step, the user equipment—upon the user equipment transitioning from a cell search and/or cell selection and/or cell reselection state towards an idle state and/or random access enabled state with the base station entity—detects the at least one downlink control signal and the specific downlink radio transmission frequency as an initial downlink radio transmission resource, and in a second step, subsequent to the first step, the user equipment receives a downlink control information from the base station entity, wherein the content or value of the downlink control information indicates or defines an initial uplink radio transmission resource, wherein the initial uplink radio transmission resource is used, by the user equipment, to access a random access channel, in uplink direction, of the base station entity in case that the user equipment requires or is required to access a random access channel of the base station entity and/or to transmit control data and/or payload data in uplink direction from the user equipment to the base station entity in case that the user equipment requires or is required to transmit control data and/or payload data to the base station entity, wherein, besides the user equipment, a further user equipment is able to communicate or to be in contact with the base station entity and also detects the at least one downlink control signal and the specific downlink radio transmission frequency as the initial downlink radio transmission resource, wherein—in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—the further user equipment uses a further initial uplink radio transmission resource, to access a random access channel, in uplink direction, of the base station entity in case that the further user equipment requires or is required to access a random access channel of the base station entity and/or to transmit control data and/or payload data in uplink direction from the further user equipment to the base station entity in case that the further user equipment requires or is required to transmit control data and/or payload data to the base station entity, wherein the further initial uplink radio transmission resource corresponds to a paired spectrum uplink radio transmission resource corresponding to or paired to the initial downlink radio transmission resource.

As the further initial uplink radio transmission resource corresponds to a paired spectrum uplink radio transmission resource corresponding to or paired to the initial downlink radio transmission resource, and the initial uplink radio transmission resource is different from the further initial uplink radio transmission resource, it is clear that the initial uplink radio transmission resource is not paired to the initial downlink radio transmission resource, i.e. it needs to be indicated—to the user equipment—via the downlink control information.

As already mentioned, according to mobile communication systems of the prior art, the use of the FDD duplex mode necessitates the allocation of radio transmission resources (uplink and downlink) having a fixedly (pre)defined duplex distance in the frequency domain. This is how a FDD/paired spectrum frequency arrangement is used, e.g., according to the principles of 3GPP defined cellular networks, cf. the various 3GPP specifications, e.g. mainly 3GPP TS 36.101/38.101. A mobile device or a user equipment, operating according to or applying the FDD duplex mode, typically scans the supported frequency bands, and, at a certain frequency, it will receive a downlink transmission of control information (from a base station entity) using a Physical Broadcast Control Channel (PBCCH) from the Public Land Mobile Network (PLMN), i.e. from the appropriate or concerned base station entity of the mobile communication network. The PBCCH carries the system information blocks (SIB) (and typically also the master information block (MIB)), i.e. a control information, which provides the user equipment with the set of information which is needed to access the radio cell (i.e. the base station entity) defined by the FDD frequency allocation scheme, e.g. for example the PLMN identity information. The actual frequency the user equipment finds the BCCH (broadcast control channel) or PBCCH (physical broadcast control channel) on is defined by a so-called "ARFCN" (Absolute Reference Frequency Channel Number); e.g., assuming LTE and FDD Band 3 (1800 MHz), the frequency arrangement is defined in 3GPP TS 36.101-1: the downlink radio transmission resource is defined as being between 1805 MHz and 1880 MHz, and the uplink radio transmission resource for Band 3 is defined as being between 1710-1785 MHz, hence, a fixed duplex frequency distance of 95 MHz is defined. Hence and according to conventionally known mobile communication networks, by knowing the ARFCN of the downlink radio transmission resource where the BCCH of a certain PLMN can be found on, a user equipment knows (by knowing the hardcoded fixed duplex distance as defined in 3GPP TS 36.101-1) that the middle frequency of the uplink part of the FDD band 3 (i.e. the radio transmission resource for the uplink direction) is arranged at "frequency of downlink radio transmission resource (FDL) minus 95 MHz" (or "ARFCN (of downlink radio transmission resource)—95 MHz"). Typically, and again according to conventionally known mobile communication networks, a bandwidth information regarding the bandwidth used on a specific FDD band, the LTE BCCH provides inside the MIB (master information block) an information or an indication about the downlink bandwidth used in the cell [cf. 3GPP TS 36.331]. The use of uplink resources for the initial access of a device to a suitable cell is done via the PRACH channel (Physical Random Access Channel) which resides inside the uplink frequency spectrum block which belongs to a certain FDD configuration (duplex distance apart from the middle frequency of the downlink channel). Thus, it is always "paired" to a given downlink spectrum frequency block. Hence, currently a fixed duplex frequency distance is applied, at least initially between a base station entity and a user equipment, between downlink and uplink frequency resources using the FDD duplex mode.

According to the present invention, this fixedly (pre) defined duplex distance (between the initially used downlink radio transmission resource, and the initially used uplink radio transmission resource) is at least relaxed in the sense that it is not necessarily applied for all user equipments within a considered radio cell, i.e. served by a certain base station entity. This means that, according to the present invention, there is at least one user equipment for which the fixedly (pre)defined duplex distance (between the initially used downlink radio transmission resource, and the initially used uplink radio transmission resource) is not applied. According to the present invention, such a (new or non-legacy) user equipment detects an initial downlink radio transmission resource (normally upon transitioning from a state without an established uplink communication link (especially a cell search state and/or a cell selection state and/or a cell reselection state) towards a state with at least the possibility of an uplink communication link (typically to a random access channel with the base station entity, especially an idle state and/or a random access enabled state)), and uses an initial uplink radio transmission resource that might be spaced apart (and typically or normally is indeed spaced apart), in the frequency domain, from the initial downlink radio transmission resource by a frequency separation or frequency distance different from the (pre)defined duplex distance. As the knowledge of the (frequency) duplex distance to be applied (i.e. between the initial downlink radio transmission resource and the initial uplink radio transmission resource) is not available to (or known by) such a (new or non-legacy) user equipment, the present invention includes some kind of indication (to be transmitted by the base station entity, typically using the initial downlink radio transmission resource), via the downlink control information, which initial uplink radio transmission resource (or which plurality of initial uplink radio transmission resources) to be used (at least initially) by the considered (new or non-legacy) user equipment. Hence, in a first step according to the inventive method, the user equipment (upon the user equipment transitioning from a cell search and/or cell selection and/or cell reselection state towards an idle state and/or random access enabled state with the base station entity) detects the at least one downlink control signal and the specific downlink radio transmission frequency as the initial downlink radio transmission resource, and in a second step, subsequent to the first step, the user equipment receives the downlink control information from the base station entity, wherein the content or value of the downlink control information indicates or defines the initial uplink radio transmission resource, wherein the initial uplink radio transmission resource is used, by the user equipment. According to the present invention the initial uplink radio transmission resource is used, by the user equipment, (1) to access a random access channel, in uplink direction, of the base station entity in case that the user equipment requires or is required to access a random access channel of the base station entity, and/or (2) to transmit control data and/or payload data in uplink direction from the user equipment to the base station entity in case that the user equipment requires or is required to transmit control data and/or payload data to the base station entity.

As, according to the present invention, the fixedly (pre) defined duplex distance (between the initially used downlink radio transmission resource, and the initially used uplink radio transmission resource to be used by a user equipment) is at least relaxed, there might be a situation where a legacy user equipment is present within the radio cell considered, and, hence, actually applies the fixedly predefined duplex distance. This means a situation might arise where—besides the above mentioned (new or non-legacy) user equipment being present which receives the downlink control information, indicating or defining the initial uplink radio transmission resource to be used—a further (legacy) user equipment is also present within the radio cell (i.e. detecting the same at least one downlink control signal and the same specific downlink radio transmission frequency as the initial downlink radio transmission resource), the further user equipment being unable to receive (and/or to decode and/or to interpret) the downlink control information, such that a further initial uplink radio transmission resource is used, by the further user equipment, in uplink direction, the further initial uplink radio transmission resource especially corresponding to an application of the (classical) fixedly (pre)defined duplex distance.

Hence, according to the present invention, it is preferred that, besides the user equipment, a further user equipment is able to communicate or to be in contact with the base station entity and also detects the at least one downlink control signal and the specific downlink radio transmission frequency as the initial downlink radio transmission resource, wherein—in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—the further user equipment uses a further initial uplink radio transmission resource, to access a random access channel, in uplink direction, of the base station entity in case that the further user equipment requires or is required to access a random access channel of the base station entity and/or to transmit control data and/or payload data in uplink direction from the further user equipment to the base station entity in case that the further user equipment requires or is required to transmit control data and/or payload data to the base station entity, wherein the further initial uplink radio transmission resource corresponds to a paired spectrum uplink radio transmission resource corresponding to or paired to the initial downlink radio transmission resource.

It is thereby advantageously possible to use the method according to the present invention in connection with all user equipments, within a radio cell or connected to a base station entity, corresponding to the user equipment (i.e. new or non-legacy user equipments), while all other user equipments corresponding to the further user equipment (i.e. legacy user equipments that are not able to receive (and/or to decode and/or to interpret) the downlink control information that indicates the initial uplink radio transmission resource to be used in case of accessing a random access channel of the base station entity and/or in case of transmitting control data and/or payload data to the base station entity) are able to be used nonetheless via the further initial uplink radio transmission resource corresponding to the ((pre)defined) paired spectrum uplink radio transmission resource corresponding to or paired to the initial downlink radio transmission resource.

According to a further embodiment of the present invention, the downlink control information from the base station entity corresponds to or comprises the master information block and/or one of potentially a plurality of system information blocks, wherein the downlink control information is especially transmitted using a broadcast control channel, especially the physical broadcast control channel of the base station entity, or using a dedicated control channel of the base station entity.

Thereby, it is advantageously possible to easily and efficiently transmit the downlink control information to the user equipment in order to inform the user equipment about which initial uplink radio transmission resource to use, at least initially (at a later stage of the connection or communication link between the user equipment and the base station entity, another uplink radio transmission resource (compared to the initial uplink radio transmission resource) might be signaled by the base station entity to be used (either instead or in addition to the initial uplink radio transmission resource) by the user equipment.

According to the present invention, it is furthermore preferred that the at least one downlink control signal corresponds to or comprises the primary synchronization signal and/or the secondary synchronization signal.

Thereby, it is advantageously possible that the user equipment detects the at least one downlink control signal in a manner analogous to the functionality in a conventionally known mobile communication network; especially, it is thereby advantageously possible that both the user equipment and the further user equipment are able to be served by the same base station entity (or that both kinds of user equipments are able to use the same downlink control signal in order to detect the at least one downlink control signal and the specific downlink radio transmission frequency as an initial downlink radio transmission resource.

According to a further preferred embodiment of the present invention, the content or value of the downlink control information indicates or defines the initial uplink radio transmission resource as a continuous frequency band, via indicating and/or defining the absolute reference frequency channel number (ARFCN) of the initial uplink radio transmission resource and/or via indicating and/or defining a bandwidth indication, the bandwidth indication especially defining the frequency resources of the initial uplink radio transmission resource, wherein the initial uplink radio transmission resource is especially defined via at least one out of the following:

the absolute reference frequency channel number (ARFCN) pointing to the middle-frequency of the initial uplink radio transmission resource, and the bandwidth indication indicates the number of resource blocks and/or absolute reference frequency channel number steps and/or a frequency difference indication indicating equally to higher and lower frequencies with respect to the middle-frequency, the absolute reference frequency channel number (ARFCN) pointing to the lowest absolute reference frequency channel number of the initial uplink radio transmission resource, and the bandwidth indication indicates the number of resource blocks and/or absolute reference frequency channel number steps and/or a frequency difference indication indicating to higher frequencies with respect to the lowest absolute reference frequency channel number, the absolute reference frequency channel number (ARFCN) pointing to the highest absolute reference frequency channel number of the initial uplink radio transmission resource, and the bandwidth indication indicates the number of resource blocks and/or absolute reference frequency channel number steps and/or a frequency difference indication indicating to lower frequencies with respect to the highest absolute reference frequency channel number, the absolute reference frequency channel number (ARFCN) pointing to the lowest absolute reference frequency channel number, and a further absolute reference frequency channel number (ARFCN) pointing to the highest absolute reference frequency channel number of the initial uplink radio transmission resource.

Thereby, it is advantageously possible to easily and efficiently transmit the downlink control information in order to indicate the initial uplink radio transmission resource as a continuous frequency band and according to different variants.

According to still a further preferred embodiment of the present invention, the content or value of the downlink control information indicates or defines the initial uplink radio transmission resource as a first continuous frequency band and at least a second continuous frequency band, via indicating and/or defining a first and at least a second absolute reference frequency channel number (ARFCN) for the first and second continuous frequency bands of the initial uplink radio transmission resource and/or via indicating and/or defining a first and at least a second bandwidth indication for the first and second continuous frequency bands, the first and at least second bandwidth indication especially defining the frequency resources of the first and at least second continuous frequency band of the initial uplink radio transmission resource, wherein especially the content or value of the downlink control information indicates or defines the initial uplink radio transmission resource as comprising a first part and a second part, wherein the first part of the initial uplink radio transmission resource is used, by the user equipment, to access a random access channel, in uplink direction, of the base station entity in case that the user equipment requires or is required to access the random access channel of the base station entity, and wherein the second part of the initial uplink radio transmission resource is used, by the user equipment, to transmit control data and/or payload data in uplink direction from the user equipment to the base station entity in case that the user equipment requires or is required to transmit control data and/or payload data to the base station entity.

Thereby, it is advantageously possible according to the present invention to easily and efficiently transmit the downlink control information in order to indicate the initial uplink radio transmission resource such that a plurality initial uplink radio transmission resources are possible to be used by the user equipment.

It is especially preferred that the first continuous frequency band and the second continuous frequency band of the initial uplink radio transmission resource (or resources) is able to be defined in a manner analogous to the above mentioned definition of the initial uplink radio transmission resources as a single frequency, namely, by defining all such plurality of frequency bands (i.e. the first and at least the second continuous frequency band of the initial uplink radio transmission resource or resources) via indicating and/or defining, respectively, the absolute reference frequency channel number (ARFCN) and/or via indicating and/or defining a bandwidth indication. Again, the absolute reference frequency channel number (ARFCN) might be pointing, respectively, to the middle-frequency of the considered frequency band, or to the lowest absolute reference frequency channel number, or to the highest absolute reference frequency channel number.

Additionally, it is especially possible, according to the present invention that the definition of the initial uplink radio transmission resource is done via using a bitmap information in order to indicate the position of the initial uplink radio transmission resource within a grid of different frequency positions and/or frequency bands (especially in case the initial uplink radio transmission resource comprises a single continuous frequency band) or the position of a least a part (such as the first continuous frequency band and the second continuous frequency band of the initial uplink radio transmission resource or resources) or of all parts of the initial uplink radio transmission resource or resources.

According to a further preferred embodiment of the present invention, —besides the frequency range of the specific downlink radio transmission frequency and of the initial downlink radio transmission resource—at least a further frequency range or further transmission resources is or are defined or predefined, by the telecommunications network, as downlink radio transmission resources, the downlink radio transmission resources comprising one or a plurality of continuous frequency range(s) being used to transmit control data and/or payload data in downlink direction from the base station entity to the user equipment in case that the base station entity requires or is required to transmit control data and/or payload data to the user equipment, wherein the content or value of the downlink control information indicates or defines the initial uplink radio transmission resource, especially including all of its parts, in a frequency range or in multiple different frequency ranges that is or are:

different from at least the frequency range of the specific downlink radio transmission frequency, and from the initial downlink radio transmission resource, or different from both the frequency range of the specific downlink radio transmission frequency, and the initial downlink radio transmission resource, on the one hand, and (from) the frequency range or plurality of frequency ranges of the downlink radio transmission resources, on the other hand.

Thereby, it is advantageously possible according to the present invention a frequency division duplex mode is realized, i.e. the definition of the initial downlink radio transmission resource(s) and the definition of the initial uplink radio transmission resource(s) (both the former and the latter either comprising one single frequency range or frequency band (or a part of a frequency band) or being possibly split into or comprise a plurality of frequency ranges or frequency bands (or parts of one frequency band or of a plurality of frequency bands)) is such that—at least regarding one and the same user equipment—the frequency range of the initial uplink radio transmission resource (or resources) is different from the specific downlink radio transmission frequency, and from the initial downlink radio transmission resource (or, in case that a plurality of downlink radio transmission resources and/or a plurality of frequency ranges are used, also from these resources or frequency ranges.

According to still a further preferred embodiment of the present invention, the content or value of the downlink control information indicates or defines the initial uplink radio transmission resource or a part thereof for all user equipments served by the base station entity, and/or indicates or defines the initial uplink radio transmission resource or a part thereof exclusively for a defined group of user equipments served by the base station entity, and/or indicates or defines the initial uplink radio transmission resource or a part thereof exclusively for a specific user equipment served by the base station entity, and/or indicates or defines the initial uplink radio transmission resource or a part thereof—especially exclusively—for a specific service subscription or plurality of service subscriptions and/or for a specific network slice or plurality of network slices.

Thereby, it is advantageously possible according to the present invention that the content of the value of the downlink control information (defining or, at least, indicating or referring to the initial uplink radio transmission resource) can be used to either address all user equipments served by the base station entity, or to differentiate between different groups of user equipments or between different individual user equipments, or to differentiate between different service subscriptions and/or between different network slices.

According to a further preferred embodiment of the present invention, the content or value of the downlink control information indicates or defines the initial uplink radio transmission resource as a first continuous frequency band and at least a second continuous frequency band, wherein a load distribution—regarding the use of either the first or the second frequency band of the initial uplink radio transmission resource—is performed via:

the user equipment drawing a random number out of a predefined range, wherein a first part of the predefined range is related to the user equipment using the first frequency band of the initial uplink radio transmission resource, and a second part of the predefined range is related to the user equipment using the second frequency band of the initial uplink radio transmission resource, and/or the user equipment uses the first frequency band of the initial uplink radio transmission resource in case of a first service orientation of the user equipment and/or in case of the use of a first network slice of the telecommunications network by the user equipment and the user equipment uses the second frequency band of the initial uplink radio transmission resource in case of a second service orientation of the user equipment and/or in case of the use of a second network slice of the telecommunications network by the user equipment.

Thereby, it is advantageously possible according to the present invention to perform a load distribution and/o to perform a distribution regarding service orientations between different user equipments.

The present invention also relates to a system for enhanced efficiency and/or flexibility in transmitting payload and/or control data in downlink and/or uplink direction between, on the one hand, a base station entity, and, on the other hand, a user equipment of a mobile communication network, the system comprising at least the base station entity and the user equipment, wherein the system is configured such that the base station entity repeatedly transmits at least one downlink control signal using a specific downlink radio transmission frequency, wherein the system is further configured such that:

the user equipment—upon the user equipment transitioning from a cell search and/or cell selection and/or cell reselection state towards an idle state and/or random access enabled state with the base station entity—detects the at least one downlink control signal and the specific downlink radio transmission frequency as an initial downlink radio transmission resource, and the user equipment receives a downlink control information from the base station entity, wherein the content or value of the downlink control information indicates or defines an initial uplink radio transmission resource, wherein the initial uplink radio transmission resource is used, by the user equipment, to access a random access channel, in uplink direction, of the base station entity in case that the user equipment requires or is required to access a random access channel of the base station entity and/or to transmit control data and/or payload data in uplink direction from the user equipment to the base station entity in case that the user equipment requires or is required to transmit control data and/or payload data to the base station entity.

Furthermore, the present invention also relates to a system for enhanced efficiency and/or flexibility in transmitting payload and/or control data in downlink and/or uplink direction between, on the one hand, a base station entity, and, on the other hand, a user equipment of a mobile communication network, the system comprising at least the base station entity and the user equipment,
wherein the system is configured such that the base station entity repeatedly transmits at least one downlink control signal using a specific downlink radio transmission frequency,
wherein the system is further configured such that:

the user equipment—upon the user equipment transitioning from a cell search and/or cell selection and/or cell reselection state towards an idle state and/or random access enabled state with the base station entity—detects the at least one downlink control signal and the specific downlink radio transmission frequency as an initial downlink radio transmission resource, and the user equipment receives a downlink control information from the base station entity, wherein the content or value of the downlink control information indicates or defines an initial uplink radio transmission resource, wherein the initial uplink radio transmission resource is used, by the user equipment, to access a random access channel, in uplink direction, of the base station entity in case that the user equipment requires or is required to access a random access channel of the base station entity and/or to transmit control data and/or payload data in uplink direction from the user equipment to the base station entity in case that the user equipment requires or is required to transmit control data and/or payload data to the base station entity, wherein, besides the user equipment, a further user equipment is able to communicate or to be in contact with the base station entity and also detects the at least one downlink control signal and the specific downlink radio transmission frequency as the initial downlink radio transmission resource, wherein—in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—the further user equipment uses a further initial uplink radio transmission resource, to access a random access channel, in uplink direction, of the base station entity in case that the further user equipment requires or is required to access a random access channel of the base station entity and/or to transmit control data and/or payload data in uplink direction from the further user equipment to the base station entity in case that the further user equipment requires or is required to transmit control data and/or payload data to the base station entity, wherein the further initial uplink radio transmission resource corresponds to a paired spectrum uplink radio transmission resource corresponding to or paired to the initial downlink radio transmission resource.

Via such a system, it is advantageously possible to enhance the efficiency and/or the flexibility in transmitting payload and/or control data in downlink and/or uplink direction—between, on the one hand, a base station entity, and, on the other hand, a user equipment of a mobile communication network—via avoiding the necessity to allocate both downlink and uplink radio transmission resources in such a manner that a fixedly (pre)defined duplex distance is observed in the frequency domain.

The present invention further relates to a user equipment for enhanced efficiency and/or flexibility in transmitting payload and/or control data in downlink and/or uplink direction between the user equipment and a base station entity of a mobile communication network,
wherein the user equipment is configured such that the user equipment receives, from the base station entity, at least one downlink control signal—the at least one downlink control signal especially being repeatedly transmitted by the base station entity—using a specific downlink radio transmission frequency,
wherein the user equipment is further configured such that:

the user equipment—upon the user equipment transitioning from a cell search and/or cell selection and/or cell reselection state towards an idle state and/or random access enabled state with the base station entity—detects the at least one downlink control signal and the specific downlink radio transmission frequency as an initial downlink radio transmission resource, and the user equipment receives a downlink control information from the base station entity, wherein the content or value of the downlink control information indicates or defines an initial uplink radio transmission resource, wherein the initial uplink radio transmission resource is used, by the user equipment, to access a random access channel, in uplink direction, of the base station entity in case that the user equipment requires or is required to access a random access channel of the base station entity and/or to transmit control data and/or payload data in uplink direction from the user equipment to the base station entity in case that the user equipment requires or is required to transmit control data and/or payload data to the base station entity.

Furthermore, the present invention also relates to a user equipment and further user equipment for enhanced efficiency and/or flexibility in transmitting payload and/or control data in downlink and/or uplink direction between each one of the user equipments and a base station entity of a mobile communication network,
wherein the user equipment is configured such that the user equipment receives, from the base station entity, at least one downlink control signal—the at least one downlink control signal especially being repeatedly transmitted by the base station entity—using a specific downlink radio transmission frequency,
wherein the user equipment is further configured such that:

the user equipment—upon the user equipment transitioning from a cell search and/or cell selection and/or cell reselection state towards an idle state and/or random access enabled state with the base station entity—detects the at least one downlink control signal and the specific downlink radio transmission frequency as an initial downlink radio transmission resource, and the user equipment receives a downlink control information from the base station entity, wherein the content or value of the downlink control information indicates or defines an initial uplink radio transmission resource, wherein the initial uplink radio transmission resource is used, by the user equipment, to access a random access channel, in uplink direction, of the base station entity in case that the user equipment requires or is required to access a random access channel of the base station entity and/or to transmit control data and/or payload data in uplink direction from the user equipment to the base station entity in case that the user equipment requires or is required to transmit control data and/or payload data to the base station entity, wherein the further user equipment also detects the at least one downlink control signal and the specific downlink radio transmission frequency as the initial downlink radio transmission resource, wherein—in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—the further user equipment uses a further initial uplink radio transmission resource, to access a random access channel, in uplink direction, of the base station entity in case that the further user equipment requires or is required to access a random access channel of the base station entity and/or to transmit control data and/or payload data in uplink direction from the further user equipment to the base station entity in case that the further user equipment requires or is required to transmit control data and/or payload data to the base station entity, wherein the further initial uplink radio transmission resource corresponds to a paired spectrum uplink radio transmission resource corresponding to or paired to the initial downlink radio transmission resource.

Via such a user equipment, it is advantageously possible to enhance the efficiency and/or the flexibility in transmitting payload and/or control data in downlink and/or uplink direction—between, on the one hand, a base station entity, and, on the other hand, a user equipment of a mobile communication network—via avoiding the necessity to allocate both downlink and uplink radio transmission resources in such a manner that a fixedly (pre)defined duplex distance is observed in the frequency domain.

The present invention further relates to a base station entity for enhanced efficiency and/or flexibility in transmitting payload and/or control data in downlink and/or uplink direction between the base station entity and a user equipment of a mobile communication network, wherein the base station entity is configured such that the base station entity repeatedly transmits at least one downlink control signal using a specific downlink radio transmission frequency, wherein the base station entity is further configured such that the base station entity—upon the user equipment transitioning from a cell search and/or cell selection and/or cell reselection state towards an idle state and/or random access enabled state with the base station entity, and detecting the at least one downlink control signal and the specific downlink radio transmission frequency as an initial downlink radio transmission resource—transmits a downlink control information to the user equipment, wherein the content or value of the downlink control information indicates or defines an initial uplink radio transmission resource, wherein the initial uplink radio transmission resource is used, to access a random access channel, in uplink direction, of the base station entity in case that the user equipment requires or is required to access a random access channel of the base station entity and/or to transmit control data and/or payload data in uplink direction from the user equipment to the base station entity in case that the user equipment requires or is required to transmit control data and/or payload data to the base station entity.

Furthermore, the present invention also relates to a base station entity for enhanced efficiency and/or flexibility in transmitting payload and/or control data in downlink and/or uplink direction between the base station entity and a user equipment of a mobile communication network, wherein the base station entity is configured such that the base station entity, especially repeatedly, transmits at least one downlink control signal using a specific downlink radio transmission frequency, wherein the base station entity is further configured such that the base station entity—upon the user equipment transitioning from a cell search and/or cell selection and/or cell reselection state towards an idle state and/or random access enabled state with the base station entity, and detecting the at least one downlink control signal and the specific downlink radio transmission frequency as an initial downlink radio transmission resource—transmits a downlink control information to the user equipment, wherein the content or value of the downlink control information indicates or defines an initial uplink radio transmission resource, wherein the initial uplink radio transmission resource is used, to access a random access channel, in uplink direction, of the base station entity in case that the user equipment requires or is required to access a random access channel of the base station entity and/or to transmit control data and/or payload data in uplink direction from the user equipment to the base station entity in case that the user equipment requires or is required to transmit control data and/or payload data to the base station entity, wherein the base station entity is further configured to communicate, besides with the user equipment, with a further user equipment (especially being is able to communicate or to be in contact with the base station entity and also detects the at least one downlink control signal and the specific downlink radio transmission frequency as the initial downlink radio transmission resource), wherein—especially in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—a further initial uplink radio transmission resource is used, to access a random access channel, in uplink direction, of the base station entity in case that the further user equipment requires or is required to access a random access channel of the base station entity and/or to transmit control data and/or payload data in uplink direction from the further user equipment to the base station entity in case that the further user equipment requires or is required to transmit control data and/or payload data to the base station entity, wherein the further initial uplink radio transmission resource corresponds to a paired spectrum uplink radio transmission resource corresponding to or paired to the initial downlink radio transmission resource.

Via such a base station entity, it is advantageously possible to enhance the efficiency and/or the flexibility in transmitting payload and/or control data in downlink and/or uplink direction—between, on the one hand, a base station entity, and, on the other hand, a user equipment of a mobile communication network—via avoiding the necessity to allocate both downlink and uplink radio transmission resources in such a manner that a fixedly (pre)defined duplex distance is observed in the frequency domain.

Furthermore, the present invention relates to a program comprising a computer readable program code which, when executed on a computer or on a user equipment or on a base station entity or on a network node of a telecommunications network, or in part on a user equipment and in part on a base station entity and/or a network node of a telecommunications network, causes the computer or the user equipment or the base station entity or the network node of a telecommunications network to perform a method according to the present invention.

Additionally, the present invention relates to a computer-readable medium comprising instructions which when executed on a computer or on a user equipment or on a base station entity or on a network node of a telecommunications network, or in part on a user equipment and in part on a base station entity and/or a network node of a telecommunications network, causes the computer or the user equipment or the base station entity or the network node of a telecommunications network to perform a method according to the present invention.

These and other characteristics, features and advantages of the present invention will become apparent from the following detailed description, taken in conjunction with the accompanying drawings, which illustrate, by way of example, the principles of the invention. The description is given for the sake of example only, without limiting the scope of the invention. The reference figures quoted below refer to the attached drawings.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where an indefinite or definite article is used when referring to a singular noun, e.g. "a", "an", "the", this includes a plural of that noun unless something else is specifically stated.

Furthermore, the terms first, second, third and the like in the description and in the claims are used for distinguishing between similar elements and not necessarily for describing a sequential or chronological order. It is to be understood that the terms so used are interchangeable under appropriate circumstances and that the embodiments of the invention described herein are capable of operation in other sequences than described of illustrated herein.

According to the present invention, an improved method for establishing or for facilitating to establish a voice communication session between a first user equipment 21 and a second user equipment 22 is disclosed.

Figure 3:
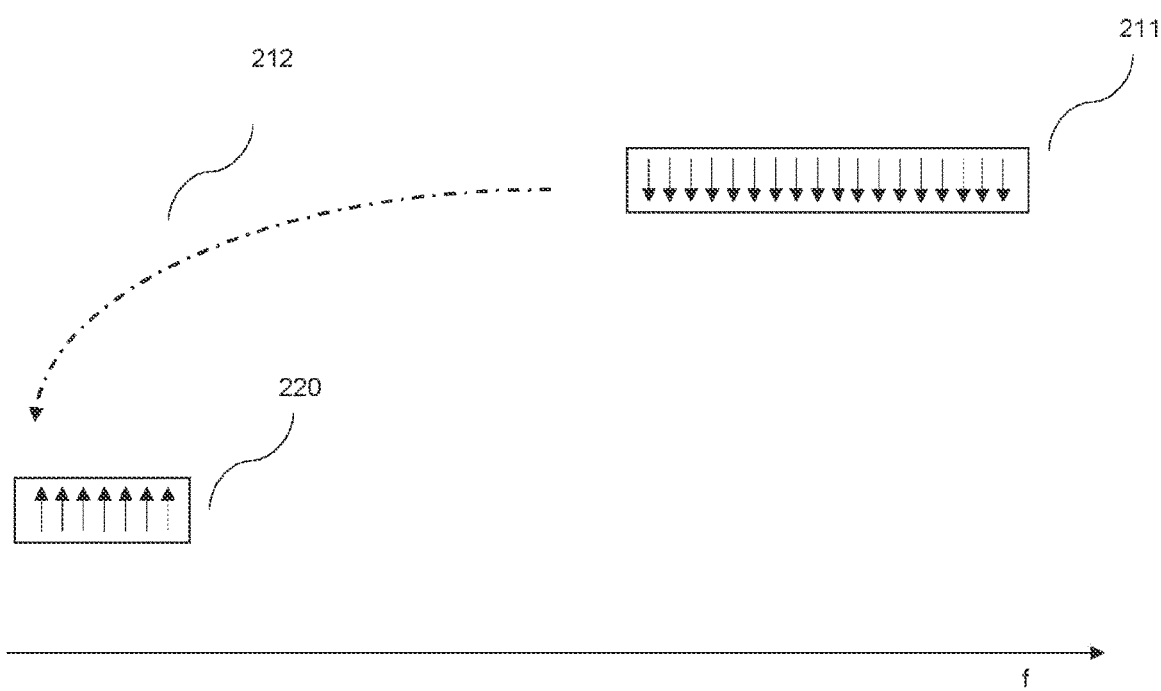
FIG. 3 schematically illustrates the basic functionality of the communication between, on the one hand, a base station entity, and, on the other hand, a user equipment of a mobile communication network according to the present invention.
Figure 4:
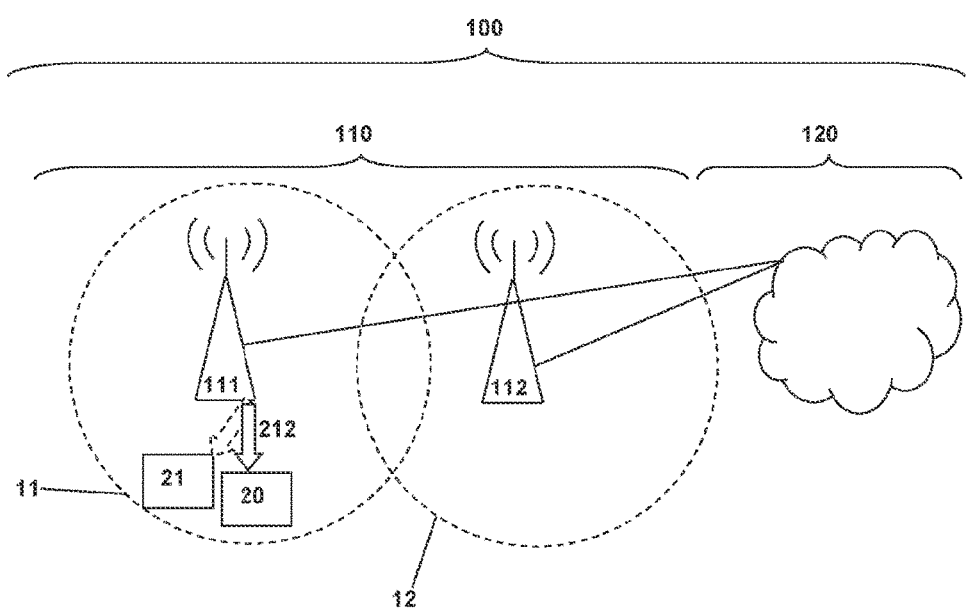
FIG. 4 schematically illustrates a mobile communication network with a user equipment and a plurality of base station entities, wherein the base station entity transmits a downlink control information to the user equipment.

In FIG. 4, a mobile communication network 100 with a user equipment 20, and a plurality of base station entities are schematically shown, namely a first base station entity 11, and a second base station entity 112. The mobile communication network 100 typically comprises an access network 110, and a core network 120, wherein the access network 110 typically comprises a plurality of radio cells, two of which are exemplarily shown in FIG. 4, namely a first radio cell 11, and a second radio cell 12. The first radio cell 11 is served by the first base station entity 111 (i.e. user equipments being located within the geographic area of the first radio cell 11 typically communicate (mainly) with the first base station entity 111), and the second radio cell 12 is served by the second base station entity 112 (i.e. user equipments being located within the geographic area of the second radio cell 12 typically communicate (mainly) with the second base station entity 112). In FIG. 4, the user equipment 20 is represented as being part of the first radio cell 11, i.e. it is served by the first base station entity 111. The transmission of a downlink control information 212 from the base station entity 111 to the user equipment 20 is schematically shown in FIG. 4, which will be described later in connection with FIG. 3. Additionally, a further user equipment 21 is schematically shown in FIG. 4, also as part of the first radio cell 11, i.e. served by the first base station entity 111; however, the further user equipment 21—being a legacy user equipment—is unable to receive and/or to decode and/or to interpret the downlink control information 212.

Figure 2:
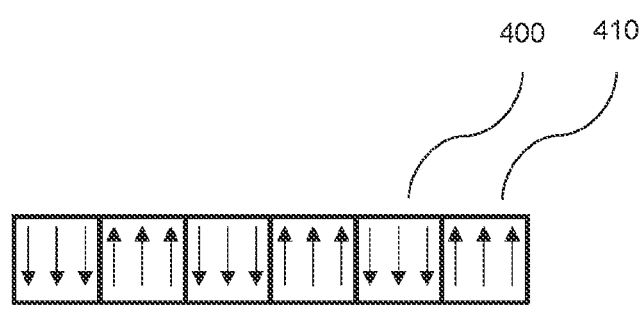
FIG. 2 schematically illustrates the basic functionality of the communication between, on the one hand, a base station entity, and, on the other hand, a user equipment of a mobile communication network according to the time division duplex mode.

Regarding the communication between the user equipment 20, on the one hand, and the corresponding base station entity 111, on the other hand, a transfer of data (typically payload data and/or control data) can either be required in the direction from the base station entity 111 towards the user equipment 20, which is called downlink direction, or it can be required in the direction from the user equipment 20 towards the base station entity 111, which is called uplink direction. In order to organize and/or arrange the transmission of data between the base station entity 111 and the user equipment 20 in uplink and downlink direction, the available transmission resources of the air interface between the user equipment 20 and the base station entity 111—such as available frequency ranges or frequency bands and/or available time slots on certain frequencies—need to be defined and assigned to the respective use and/or direction. Typically, two main duplex modes are currently used in typical mobile communication network systems, namely the "paired spectrum" duplex mode, also known as "FDD spectrum" (FDD—Frequency Division Duplex), and the so-called Time-Division Duplex (TDD). These two duplex modes are schematically shown in FIGS. 1 and 2: In FIG. 1, the basic functionality of the communication between the base station entity 111 and the user equipment 20 of the mobile communication network 100 is schematically shown according to the frequency division duplex mode (FDD), and in FIG. 2, the basic functionality of the communication between the base station entity 111 and the user equipment 20 of the mobile communication network 100 is schematically shown according to the time division duplex mode (TDD). In both figures arrows directed downwardly represent radio transmission resources for the downlink transmission of data, whereas arrows directed upwardly represent radio transmission resources for the uplink transmission of data.

In FIG. 1, a first rectangle, designated by reference sign 300 denotes radio transmission resources for the downlink transmission, and a second rectangle, designated by reference sign 310 denotes radio transmission resources for the uplink transmission. The first and second rectangles 300, 310 are vertically spaced apart in order to denote a certain separation in the frequency domain of the respective radio transmission resource, namely the so-called Duplex-Distance. It is also said that both spectral parts (represented by the rectangles 300, 310) constitute paired spectral parts, i.e. both are at least in part fixedly assigned to each other and used for the downlink or uplink transmission, respectively (in case that the time division duplex mode is applied). Hence, according to the (paired spectrum) duplex mode (FDD), a certain (first) part 300 of the available frequency spectrum is allocated to downlink (DL) transmissions, while another (second) part 310 of the available spectrum—having a predefined, "paired", frequency separation or frequency distance from the first part—is allocated to uplink (UL) transmissions. The (predefined) frequency separation between the uplink and the downlink frequency is called "Duplex Distance" and is typically fixedly defined or predefined for any given FDD band. The term "band" or "frequency band" is a representation of the frequency where wireless devices can operate. A so-called "FDD band", hence, includes a definition of a downlink frequency, which typically denotes the middle-frequency of a part of the frequency spectrum (of that frequency band), with a given bandwidth (e.g., according to the LTE standard, a bandwidth of typically 5 MHz, 10 MHz or at maximum 20 MHz), while the uplink frequency has the same bandwidth (5 MHz, 10 MHz or 20 MHz in case of LTE) and which middle-frequency is placed the duplex distance below (typically) or above (less typical) of the middle-frequency of the downlink bandwidth.

In FIG. 2, a number of rectangles or boxes having arrows of the same direction within each box, and arrows of opposite direction in adjacent rectangles or boxes. One such box, having downwardly facing arrows, is designated by reference sign 400—indicating a radio transmission resource used for the downlink transmission of data—, and another such box, having upwardly facing arrows, is designated by reference sign 410—indicating a radio transmission resource used for the uplink transmission of data. The boxes in FIG. 2 are represented to be arranged adjacent in horizontal direction (representing different time slots) to denote that, while using the same transmission frequency or frequency resource (represented by all rectangles or boxes being arranged on the same height in vertical direction), different time slots are used for the uplink and downlink transmission of data, respectively, hence illustrating the use of the time division duplex mode (TDD). According to this duplex mode, a single block of the frequency spectrum is used for both uplink (UL) and downlink (DL) transmission of data but in a time duplexing manner, i.e. on a given frequency spectrum block, both uplink and downlink transmissions occur at different points in time, e.g. in an alternating manner. TDD is also known as "unpaired spectrum".

In FIG. 3, the basic functionality according to the present invention of the communication between, on the one hand, the base station entity 111, and, on the other hand, the user equipment 20 of the mobile communication network 100 is schematically shown. A first rectangle, having downwardly facing arrows, is designated by reference sign 211 and denotes an initial downlink radio transmission resource. A second rectangle, having upwardly facing arrows, is designated by reference sign 220 and denotes an initial uplink radio transmission resource. The initial downlink radio transmission resource 211 is typically linked to at least one downlink control signal transmitted by the base station entity 111. The downlink control signal is normally repeatedly transmitted by the base station entity 111 in order to allow user equipment to detect the at least one downlink control signal as the initial downlink radio transmission resource 211. Typically, the at least one downlink control signal uses a specific downlink radio transmission frequency which is also associated or assigned to the initial downlink radio transmission resource 211.

The present invention especially refers to the initial stages of the communication contact between the user equipment 20 and the base station entity 111, hence the term "initial" downlink radio transmission resource, meaning that after the initial communication contact having been established, it is possible that the base station entity 111 requires the user equipment 20 to use another frequency for uplink and/or downlink data transmission. Hence, the detection, by the user equipment 20, of the at least one downlink control signal (using the specific downlink radio transmission frequency) typically occurs upon the user equipment 20 transitioning from a cell search and/or cell selection and/or cell reselection state towards an idle state and/or random access enabled state with the base station entity 111. The detection of the at least one downlink control signal (using the specific downlink radio transmission frequency, and especially corresponding to or comprising the primary synchronization signal and/or the secondary synchronization signal) by the user equipment 20 defines the initial downlink radio transmission resource 211 which is especially used to transmit (or which comprises) the master information block and/or one of potentially a plurality of system information blocks.

Compared to the conventionally known frequency division duplex mode—schematically shown in FIG. 1—the invention provides a higher degree of flexibility in assigning the initial uplink radio transmission resource 220 used by the user equipment 20 and the base station entity 111 for the transmission of (control and/or payload) data in uplink direction: Instead of (pre)defining (or assigning) the uplink radio transmission resource with a fixedly defined or predefined duplex frequency distance, the present invention provides the possibility to more freely or flexibly assign the initial uplink radio transmission resource 220 to be used by the user equipment 20 for (control and/or payload) data transmission in uplink direction without necessarily respecting the duplex frequency distance. In order to inform the user equipment 20 of the frequency range to use (as initial uplink radio transmission resource 220), the downlink control information 212 is transmitted from the base station entity 111 to the user equipment 20, which is indicated, in FIG. 3, via a dot-dashed arrow pointing towards the initial uplink radio transmission resource 220. Hence, the user equipment 20 receives the downlink control information 212 from the base station entity, wherein the content or value of the downlink control information 212 indicates or defines the initial uplink radio transmission resource 220 to be used by the user equipment 20 to access a random access channel, in uplink direction, of the base station entity 111 in case that the user equipment 20 requires or is required to access a random access channel of the base station entity 111 and/or to transmit control data and/or payload data in uplink direction from the user equipment 20 to the base station entity 111 in case that the user equipment 20 requires or is required to transmit control data and/or payload data to the base station entity 111.

Hence, as an improvement of the conventionally known frequency division duplex mode, the present invention removes the fixed downlink and uplink pairing of the frequency spectrum blocks and introduces, via the transmitting of the downlink control information 212, a signaling procedure on a downlink control channel, especially on the broadcast control channel or on a control channel dedicated for or to the user equipment 20 (i.e. on a dedicated control channel (DCCH) for the user equipment 20), which allows—for the purpose of defining the initial uplink radio transmission resource 220—a flexible pointing to any possible uplink frequency or frequency block (typically (but not necessarily) defined via the absolute reference frequency channel number (ARFCN)), and any related bandwidth allowing for a flexible configuration or a flexible allocation or a flexible assignment of any uplink frequency portion (or frequency block) to any downlink band. Thereby, it is advantageously possible according to the present invention that any part of the spectrum can be flexibly used for downlink or for uplink transmissions. Of course, the efficient use of the signaling procedure includes the user equipment 20 being able to interpret the downlink control information 212 (i.e. a user equipment needs to be able to receive and/or to decode and/or to interpret the downlink control information 212 such that the content or value of the downlink control information 212 indicates or defines the initial uplink radio transmission resource 220 to be used, especially in case of accessing a random access channel of the base station entity 111). Hence, in case that a further user equipment 21 (cf. FIG. 4) is unable to receive and/or to decode and/or to interpret the downlink control information 212 (such that the content or value of the downlink control information 212 indicates or defines the initial uplink radio transmission resource 220 to be used) in case of accessing a random access channel of the base station entity 111 and/or in case of transmitting control data and/or payload data to the base station entity 111—such a further user equipment 21 will use the classically defined (i.e. paired) uplink radio transmission resources instead of the initial uplink radio transmission resource 220 indicated by the downlink control information 212, hence it will use a further initial uplink radio transmission resource. This is why, in a transition phase, it is advisable to at least allow the paired spectrum frequency resource to be used, by such a further (or legacy) user equipment 21, i.e. keep the current structure of defined discrete bands with uplink and downlink assignments but also allow the flexible "pairing" of any uplink frequency spectrum block with any downlink frequency spectrum block. Especially, the BCCH/DCCH signaling would—according to one embodiment of the present invention—typically use an ARFCN of the uplink pointing to the middle frequency of the spectrum part which denotes the uplink frequency part (i.e. the initial uplink radio transmission resource 220). The bandwidth might be defined by further signaling parts of the downlink control information 212, defining the bandwidth to be used for the uplink transmissions. Hence, in case that the initial uplink radio transmission resource 220 shall be used as a continuous frequency band, this could be indicated or defined, by the content or value of the downlink control information 212, via indicating and/or defining the absolute reference frequency channel number (ARFCN) of the initial uplink radio transmission resource 220 and/or via indicating and/or defining a bandwidth indication according to at least one out of the following examples:

the absolute reference frequency channel number (ARFCN) pointing to the middle-frequency of the initial uplink radio transmission resource 220, and the bandwidth indication indicates the number of resource blocks and/or absolute reference frequency channel number steps and/or a frequency difference indication indicating equally to higher and lower frequencies with respect to the middle-frequency, the absolute reference frequency channel number (ARFCN) pointing to the lowest absolute reference frequency channel number of the initial uplink radio transmission resource 220, and the bandwidth indication indicates the number of resource blocks and/or absolute reference frequency channel number steps and/or a frequency difference indication indicating to higher frequencies with respect to the lowest absolute reference frequency channel number, the absolute reference frequency channel number (ARFCN) pointing to the highest absolute reference frequency channel number of the initial uplink radio transmission resource 220, and the bandwidth indication indicates the number of resource blocks and/or absolute reference frequency channel number steps and/or a frequency difference indication indicating to lower frequencies with respect to the highest absolute reference frequency channel number, the absolute reference frequency channel number (ARFCN) pointing to the lowest absolute reference frequency channel number, and a further absolute reference frequency channel number (ARFCN) pointing to the highest absolute reference frequency channel number of the initial uplink radio transmission resource 220.

According to further embodiments of the present invention, different uplink configurations are possible for a given downlink part, i.e. different uplink configurations are defined for a given downlink part, or, alternatively, it is also possible also possible to flexibly define multiple uplink parts for the same downlink part. Hence, the initial uplink radio transmission resource 220 might be defined as (or as comprising) a first continuous frequency band and at least a second continuous frequency band (but especially also comprising a third, fourth, fifth, etc. continuous frequency band), especially via indicating and/or defining corresponding defining pieces of information (as part of the downlink control information 212), i.e. a first and at least a second (but perhaps also a third, fourth, fifth, etc.) absolute reference frequency channel number (ARFCN) for the first and second (or further) continuous frequency bands of the initial uplink radio transmission resource 220 and/or via indicating and/or defining a first and at least a second (but perhaps also a third, fourth, fifth, etc.) bandwidth indication for the first and second (or further) continuous frequency bands, the first and at least second bandwidth indication especially defining the frequency resources of the first and at least second continuous frequency band of the initial uplink radio transmission resource 220.

Especially, the initial uplink radio transmission resource 220 is defined as comprising a first part and a second part, wherein the first part of the initial uplink radio transmission resource 220 is used, by the user equipment 20, to access a random access channel, in uplink direction, of the base station entity 111 in case that the user equipment 20 requires or is required to access the random access channel of the base station entity 111, and wherein the second part of the initial uplink radio transmission resource 220 is used, by the user equipment 20, to transmit control data and/or payload data in uplink direction from the user equipment 20 to the base station entity 111 in case that the user equipment 20 requires or is required to transmit control data and/or payload data to the base station entity 111.

According to further embodiments of the present invention, it is also possible to define different uplink parts (of the initial uplink radio transmission resource 220) for different user groups and/or depending on the service subscription (e.g. for different network slices). Hence, the content or value of the downlink control information 212 indicates or defines the initial uplink radio transmission resource 220 or a part thereof for all user equipments served by the base station entity 111, and/or indicates or defines the initial uplink radio transmission resource 220 or a part thereof exclusively for a defined group of user equipments served by the base station entity 111, and/or indicates or defines the initial uplink radio transmission resource 220 or a part thereof exclusively for a specific user equipment served by the base station entity 111, and/or indicates or defines the initial uplink radio transmission resource 220 or a part thereof—especially exclusively—for a specific service subscription or plurality of service subscriptions and/or for a specific network slice or plurality of network slices.

It is to be understood that, according to the present invention, an overlap, in the frequency domain, of the frequency resources used for downlink communication (especially the initial downlink radio transmission resource 211), on the one hand, and of the frequency resources used for uplink communication (especially the initial uplink radio transmission resource 220), on the other hand, should, in principle, be avoided. In case that the initial downlink radio transmission resource 211 does not cover all the those frequency resources used for downlink communication, this also includes a further frequency range or further transmission resources which is or are defined or predefined, by the telecommunications network 100, as downlink radio transmission resources. Hence, it is preferred according to the present invention that the content or value of the downlink control information 212 indicates or defines the initial uplink radio transmission resource 220, especially including all of its parts, in a frequency range or in multiple different frequency ranges that is or are:

different from at least the frequency range of the specific downlink radio transmission frequency, and from the initial downlink radio transmission resource (211), or different from both the frequency range of the specific downlink radio transmission frequency, and the initial downlink radio transmission resource (211), on the one hand, and the frequency range or plurality of frequency ranges of the downlink radio transmission resources, on the other hand (i.e. in case that—besides the frequency range of the specific downlink radio transmission frequency and of the initial downlink radio transmission resource 211—at least a further frequency range or further transmission resources is or are defined or predefined, by the telecommunications network 100, as downlink radio transmission resources, the downlink radio transmission resources comprising one or a plurality of continuous frequency range(s) being used to transmit control data and/or payload data in downlink direction from the base station entity 111 to the user equipment 20 in case that the base station entity 111 requires or is required to transmit control data and/or payload data to the user equipment 20).

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for enhanced efficiency and/or flexibility in transmitting payload and/or control data in downlink and/or uplink directions between, on the one hand, a base station entity, and, on the other hand, a user equipment of a mobile communication network, wherein the base station entity repeatedly transmits at least one downlink control signal using a specific downlink radio transmission frequency, wherein the method comprises the following steps:

in a first step, the user equipment—upon the user equipment transitioning from a cell search and/or cell selection and/or cell reselection state towards an idle state and/or random access enabled state with the base station entity—detects the at least one downlink control signal and the specific downlink radio transmission frequency as an initial downlink radio transmission resource; and in a second step, subsequent to the first step, the user equipment receives downlink control information from the base station entity, wherein the content or value of the downlink control information indicates or defines an initial uplink radio transmission resource;

wherein the initial uplink radio transmission resource is used, by the user equipment, to: access a random access channel, in the uplink direction, of the base station entity in case that the user equipment requires or is required to access a random access channel of the base station entity; and/or transmit control data and/or payload data in the uplink direction from the user equipment to the base station entity in case that the user equipment requires or is required to transmit control data and/or payload data to the base station entity;

wherein, besides the user equipment, a further user equipment is able to communicate or to be in contact with the base station entity and also detects the at least one downlink control signal and the specific downlink radio transmission frequency as the initial downlink radio transmission resource, wherein—in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—the further user equipment uses a further initial uplink radio transmission resource to: access a random access channel, in the uplink direction, of the base station entity in case that the further user equipment requires or is required to access a random access channel of the base station entity; and/or transmit control data and/or payload data in the uplink direction from the further user equipment to the base station entity in case that the further user equipment requires or is required to transmit control data and/or payload data to the base station entity;

wherein the further initial uplink radio transmission resource corresponds to a paired spectrum uplink radio transmission resource corresponding to or paired to the initial downlink radio transmission resource.

2. The method according to claim 1, wherein the downlink control information from the base station entity corresponds to or comprises the master information block and/or one of a plurality of system information blocks, wherein the downlink control information is transmitted using the physical broadcast control channel of the base station entity, or using a dedicated control channel of the base station entity.

3. The method according to claim 1, wherein the at least one downlink control signal corresponds to or comprises the primary synchronization signal and/or the secondary synchronization signal.

4. The method according to claim 1, wherein the content or value of the downlink control information indicates or defines the initial uplink radio transmission resource as a continuous frequency band, via indicating and/or defining the absolute reference frequency channel number (ARFCN) of the initial uplink radio transmission resource and/or via indicating and/or defining a bandwidth indication, the bandwidth indication defining the frequency resources of the initial uplink radio transmission resource;

wherein the initial uplink radio transmission resource is defined via at least one out of the following:

the ARFCN pointing to the middle-frequency of the initial uplink radio transmission resource, and the bandwidth indication indicating the number of resource blocks and/or absolute reference frequency channel number steps and/or a frequency difference indication indicating equally to higher and lower frequencies with respect to the middle-frequency;

the ARFCN pointing to the lowest absolute reference frequency channel number of the initial uplink radio transmission resource, and the bandwidth indication indicating the number of resource blocks and/or absolute reference frequency channel number steps and/or a frequency difference indication indicating to higher frequencies with respect to the lowest absolute reference frequency channel number;

the ARFCN pointing to the highest absolute reference frequency channel number of the initial uplink radio transmission resource, and the bandwidth indication indicating the number of resource blocks and/or absolute reference frequency channel number steps and/or a frequency difference indication indicating to lower frequencies with respect to the highest absolute reference frequency channel number; or the ARFCN pointing to the lowest absolute reference frequency channel number, and a further ARFCN pointing to the highest absolute reference frequency channel number of the initial uplink radio transmission resource.

5. The method according to claim 1, wherein the content or value of the downlink control information indicates or defines the initial uplink radio transmission resource as a first continuous frequency band and at least a second continuous frequency band, via indicating and/or defining a first and at least a second absolute reference frequency channel number ARFCN for the first and second continuous frequency bands of the initial uplink radio transmission resource and/or via indicating and/or defining a first and at least a second bandwidth indications for the first and second continuous frequency bands, the first and at least second bandwidth indications defining the frequency resources of the first and at least second continuous frequency band of the initial uplink radio transmission resource;

wherein the content or value of the downlink control information indicates or defines the initial uplink radio transmission resource as comprising a first part and a second part, wherein the first part of the initial uplink radio transmission resource is used, by the user equipment, to access a random access channel, in the uplink direction, of the base station entity in case that the user equipment requires or is required to access the random access channel of the base station entity, and wherein the second part of the initial uplink radio transmission resource is used, by the user equipment, to transmit control data and/or payload data in the uplink direction from the user equipment to the base station entity in case that the user equipment requires or is required to transmit control data and/or payload data to the base station entity.

6. The method according to claim 1, wherein—besides the frequency range of the specific downlink radio transmission frequency and of the initial downlink radio transmission resource at least a further frequency range or further transmission resources is or are defined or predefined, by the telecommunications network, as downlink radio transmission resources, the downlink radio transmission resources comprising one or a plurality of continuous frequency range(s) being used to transmit control data and/or payload data in downlink direction from the base station entity to the user equipment in case that the base station entity requires or is required to transmit control data and/or payload data to the user equipment;

wherein the content or value of the downlink control information indicates or defines the initial uplink radio transmission resource, including all of its parts, in a frequency range or in multiple different frequency ranges that is or are:

different from at least the frequency range of the specific downlink radio transmission frequency, and from the initial downlink radio transmission resource; or different from both the frequency range of the specific downlink radio transmission frequency, and the initial downlink radio transmission resource, on the one hand, and the frequency range or plurality of frequency ranges of the downlink radio transmission resources, on the other hand.

7. The method according to claim 1, wherein the content or value of the downlink control information indicates or defines:

the initial uplink radio transmission resource or a part thereof for all user equipments served by the base station entity; and/or the initial uplink radio transmission resource or a part thereof exclusively for a defined group of user equipments served by the base station entity; and/or the initial uplink radio transmission resource or a part thereof exclusively for a specific user equipment served by the base station entity; and/or the initial uplink radio transmission resource or a part thereof—exclusively—for a specific service subscription or plurality of service subscriptions and/or for a specific network slice or plurality of network slices.

8. The method according to claim 1, wherein the content or value of the downlink control information indicates or defines the initial uplink radio transmission resource as a first continuous frequency band and at least a second continuous frequency band, wherein a load distribution—regarding the use of either the first or the second frequency band of the initial uplink radio transmission resource—is performed via:
the user equipment drawing a random number out of a predefined range, wherein a first part of the predefined range is related to the user equipment using the first frequency band of the initial uplink radio transmission resource, and a second part of the predefined range is related to the user equipment using the second frequency band of the initial uplink radio transmission resource; and/or
the user equipment using the first frequency band of the initial uplink radio transmission resource in case of a first service orientation of the user equipment and/or in case of the use of a first network slice of the telecommunications network by the user equipment and the user equipment using the second frequency band of the initial uplink radio transmission resource in case of a second service orientation of the user equipment and/or in case of the use of a second network slice of the telecommunications network by the user equipment.

9. A system for enhanced efficiency and/or flexibility in transmitting payload and/or control data in downlink and/or uplink directions between, on the one hand, a base station entity, and, on the other hand, a user equipment of a mobile communication network, the system comprising:
the base station entity;
the user equipment; and
a further user equipment;
wherein the base station entity is configured to repeatedly transmit at least one downlink control signal using a specific downlink radio transmission frequency;
wherein the user equipment—upon the user equipment transitioning from a cell search and/or cell selection and/or cell reselection state towards an idle state and/or random access enabled state with the base station entity—detects is configured to detect the at least one downlink control signal and the specific downlink radio transmission frequency as an initial downlink radio transmission resource;
wherein the user equipment is configured to receive downlink control information from the base station entity, wherein the content or value of the downlink control information indicates or defines an initial uplink radio transmission resource, wherein the initial uplink radio transmission resource is used, by the user equipment, to: access a random access channel, in the uplink direction, of the base station entity in case that the user equipment requires or is required to access a random access channel of the base station entity; and/or transmit control data and/or payload data in the uplink direction from the user equipment to the base station entity in case that the user equipment requires or is required to transmit control data and/or payload data to the base station entity,
wherein, the further user equipment is configured to communicate or to be in contact with the base station entity and also detect the at least one downlink control signal and the specific downlink radio transmission frequency as the initial downlink radio transmission resource, wherein—in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—the further user equipment uses a further initial uplink radio transmission resource to: access a random access channel, in the uplink direction, of the base station entity in case that the further user equipment requires or is required to access a random access channel of the base station entity and/or transmit control data and/or payload data in the uplink direction from the further user equipment to the base station entity in case that the further user equipment requires or is required to transmit control data and/or payload data to the base station entity;
wherein the further initial uplink radio transmission resource corresponds to a paired spectrum uplink radio transmission resource corresponding to or paired to the initial downlink radio transmission resource.

10. A base station entity for enhanced efficiency and/or flexibility in transmitting payload and/or control data in downlink and/or uplink directions between the base station entity and a user equipment of a mobile communication network;
wherein the base station entity is configured such that the base station entity, especially repeatedly, transmits at least one downlink control signal using a specific downlink radio transmission frequency;
wherein the base station entity is further configured such that the base station entity—upon the user equipment transitioning from a cell search and/or cell selection and/or cell reselection state towards an idle state and/or random access enabled state with the base station entity, and detecting the at least one downlink control signal and the specific downlink radio transmission frequency as an initial downlink radio transmission resource—transmits downlink control information to the user equipment, wherein the content or value of the downlink control information indicates or defines an initial uplink radio transmission resource, wherein the initial uplink radio transmission resource is used to: access a random access channel, in the uplink direction, of the base station entity in case that the user equipment requires or is required to access a random access channel of the base station entity; and/or transmit control data and/or payload data in the uplink direction from the user equipment to the base station entity in case that the user equipment requires or is required to transmit control data and/or payload data to the base station entity;
wherein the base station entity is further configured to communicate, besides with the user equipment, with a further user equipment, wherein—in case that the further user equipment is unable to receive and/or to decode and/or to interpret the downlink control information such that the content or value of the downlink control information indicates or defines the initial uplink radio transmission resource to be used in case of accessing a random access channel of the base station entity and/or in case of transmitting control data and/or payload data to the base station entity—a further initial uplink radio transmission resource is used to: access a random access channel, in the uplink direction, of the base station entity in case that the further user equipment requires or is required to access a random access channel of the base station entity; and/or transmit control data and/or payload data in the uplink direction from the further user equipment to the base station entity in case that the further user equipment requires or is required to transmit control data and/or payload data to the base station entity;

wherein the further initial uplink radio transmission resource corresponds to a paired spectrum uplink radio transmission resource corresponding to or paired to the initial downlink radio transmission resource.

11. A program comprising a computer readable program code which, when executed on a computer or on a user equipment or on a base station entity or on a network node of a telecommunications network, or in part on a user equipment and in part on a base station entity and/or a network node of a telecommunications network, causes the computer or the user equipment or the base station entity or the network node of a telecommunications network to perform a method according to claim 1.

12. A computer-readable medium comprising instructions which, when executed on a computer or on a user equipment or on a base station entity or on a network node of a telecommunications network, or in part on a user equipment and in part on a base station entity and/or a network node of a telecommunications network, causes the computer or the user equipment or the base station entity or the network node of a telecommunications network to perform a method according to claim 1.

* * * * *